US009779268B1

(12) United States Patent
Colgrove et al.

(10) Patent No.: US 9,779,268 B1
(45) Date of Patent: Oct. 3, 2017

(54) UTILIZING A NON-REPEATING IDENTIFIER TO ENCRYPT DATA

(71) Applicant: Pure Storage, Inc., Mountain View, CA (US)

(72) Inventors: John Colgrove, Los Altos, CA (US); Mark L. McAuliffe, Palo Alto, CA (US); Ethan L. Miller, Santa Cruz, CA (US); Naveen Neelakantam, Mountain View, CA (US); Marco Sanvido, Belmont, CA (US); Neil A. Vachharajani, San Francisco, CA (US); Taher Vohra, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 176 days.

(21) Appl. No.: 14/730,202

(22) Filed: Jun. 3, 2015

Related U.S. Application Data

(60) Provisional application No. 62/007,200, filed on Jun. 3, 2014.

(51) Int. Cl.
*G06F 21/00* (2013.01)
*G06F 21/78* (2013.01)
*H04L 9/06* (2006.01)

(52) U.S. Cl.
CPC .............. *G06F 21/78* (2013.01); *H04L 9/065* (2013.01)

(58) Field of Classification Search
CPC .................................. G06F 21/78; H04L 9/065
See application file for complete search history.

(56) References Cited

U.S. PATENT DOCUMENTS

| 5,208,813 | A  | 5/1993  | Stallmo         |
|-----------|----|---------|-----------------|
| 5,403,639 | A  | 4/1995  | Belsan et al.   |
| 5,940,838 | A  | 8/1999  | Schmuck et al.  |
| 6,263,350 | B1 | 7/2001  | Wollrath et al. |
| 6,412,045 | B1 | 6/2002  | DeKoning et al. |
| 6,718,448 | B1 | 4/2004  | Ofer            |
| 6,757,769 | B1 | 6/2004  | Ofer            |
| 6,799,283 | B1 | 9/2004  | Tamai et al.    |
| 6,834,298 | B1 | 12/2004 | Singer et al.   |
| 6,850,938 | B1 | 2/2005  | Sadjadi         |

(Continued)

FOREIGN PATENT DOCUMENTS

| CN | 103370685 A | 10/2013 |
|----|-------------|---------|
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Mahfuzur Rahman
(74) *Attorney, Agent, or Firm* — Edward J. Lenart; Kennedy Lenart Spraggins LLP

(57) ABSTRACT

Utilizing a non-repeating identifier to encrypt data, including: receiving a request to write data to a storage device; selecting a segment-offset pair where the data will be stored, where the selected segment-offset pair is unique to every other segment-offset pair utilized during the lifetime of the storage device; and encrypting the data in dependence upon an identifier of the segment-offset pair.

12 Claims, 6 Drawing Sheets

(56) References Cited

U.S. PATENT DOCUMENTS

| | | |
|---|---|---|
| 6,915,434 B1 | 7/2005 | Kuroda |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,117,464 B1 * | 2/2012 | Kogelnik ............ H04L 63/0428 380/284 |
| 8,205,065 B2 | 6/2012 | Matze |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 * | 12/2013 | Stephenson ............ G06F 12/14 713/189 |
| 8,700,875 B1 | 4/2014 | Barron et al. |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 * | 10/2013 | Talagala ............ G06F 12/0246 711/103 |
| 2013/0283058 A1 * | 10/2013 | Fiske ................ G06F 21/602 713/189 |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 * | 3/2014 | Resch ................ G06F 21/6272 726/30 |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-95/02349 A1 | 1/1995 |
| WO | WO-99/13403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

* cited by examiner

UTILIZING A NON-REPEATING IDENTIFIER TO ENCRYPT DATA

CROSS-REFERENCE TO RELATED APPLICATION

This application is a non-provisional application for patent entitled to a filing date and claiming the benefit of earlier-filed U.S. Provisional Patent Application Ser. No. 62/007,200, filed on Jun. 3, 2014.

BACKGROUND

Field of Technology

The field of technology is data processing, or, more specifically, methods, apparatuses, and products for utilizing a non-repeating identifier to encrypt data.

Description of Related Art

Storage systems often utilize a large number of storage devices for storing data. In many cases, the data stored on the storage devices may be confidential or otherwise proprietary. In such cases, there is a need to prevent access to the confidential or otherwise proprietary data by unauthorized users. In some cases, encryption may be used to protect data. While such an approach improves the security of the data, unauthorized persons may still seek ways to circumvent the encryption and gain access to the data.

SUMMARY

Methods, apparatus, and products for utilizing a non-repeating identifier to encrypt data, including: receiving a request to write data to a storage device; selecting a segment-offset pair where the data will be stored, wherein the selected segment-offset pair is unique to every other segment-offset pair utilized during a lifetime of the storage device; and encrypting the data in dependence upon an identifier of the segment-offset pair.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
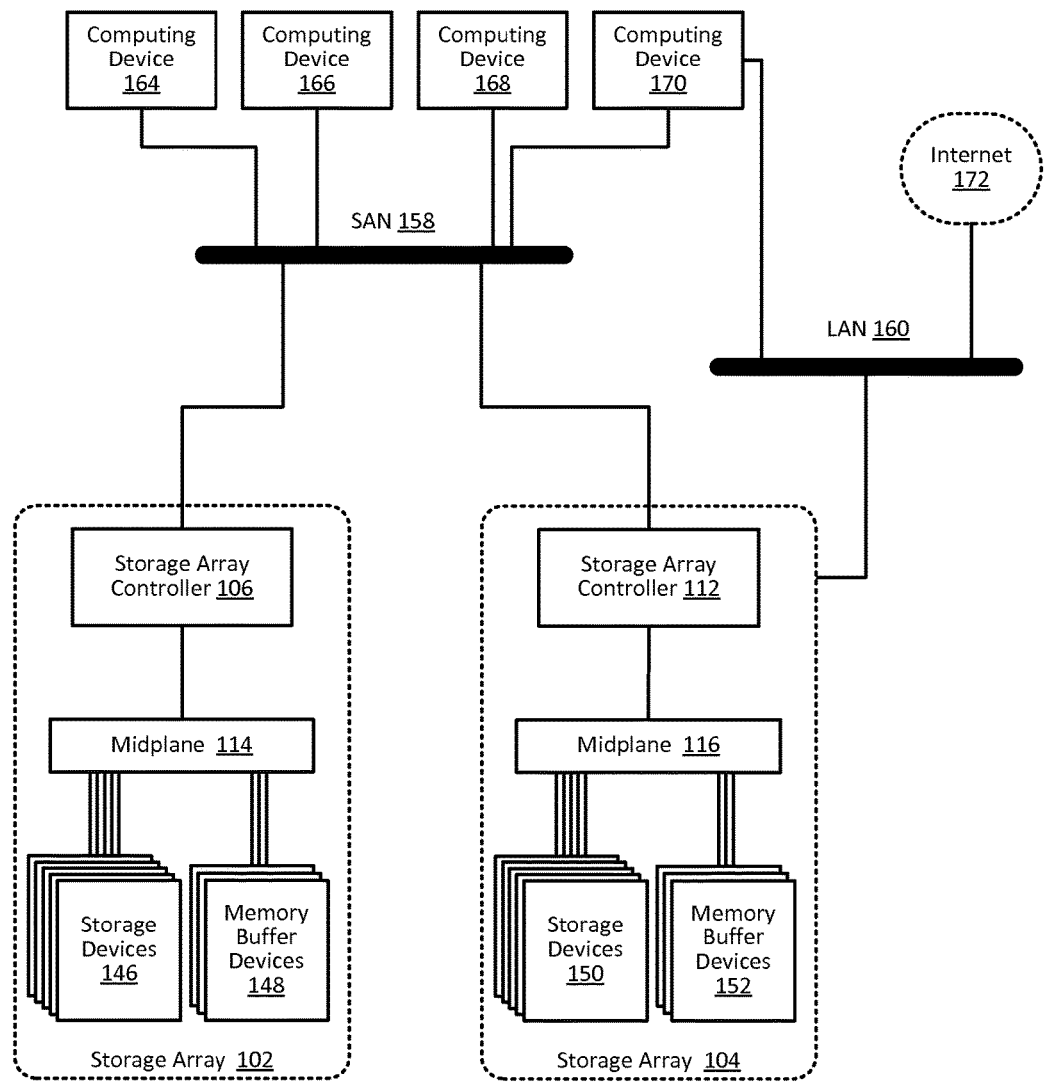
FIG. 1 sets forth a block diagram of an example system configured for utilizing a non-repeating identifier to encrypt data according to embodiments of the present invention.

Example methods, apparatuses, and products for utilizing a non-repeating identifier to encrypt data in accordance with the present invention are described with reference to the accompanying drawings, beginning with FIG. 1. FIG. 1 sets forth a block diagram of a system configured for utilizing a non-repeating identifier to encrypt data according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The storage array controllers (106, 112) of FIG. 1 may be configured for utilizing a non-repeating identifier to encrypt data according to embodiments of the present invention. The storage array controllers (106, 112) may utilize a non-repeating identifier to encrypt data by receiving a request to write data to a storage device; selecting a segment-offset pair where the data will be stored, where the selected segment-offset pair is unique to every other segment-offset pair utilized during the lifetime of the storage device; and encrypting the data in dependence upon an identifier of the segment-offset pair, as will be described in greater detail below.

In an alternative embodiment, the storage devices (146, 150) themselves may be configured for utilizing a non-repeating identifier to encrypt data according to embodiments of the present invention. The storage devices (146, 150) may utilize a non-repeating identifier to encrypt data by receiving a request to write data to a storage device; selecting a segment-offset pair where the data will be stored, where the selected segment-offset pair is unique to every other segment-offset pair utilized during the lifetime of the storage device; and encrypting the data in dependence upon an identifier of the segment-offset pair, as will be described in greater detail below.

The arrangement of computing devices, storage arrays, networks, and other devices making up the example system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Utilizing a non-repeating identifier to encrypt data in accordance with embodiments of the present invention is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful for utilizing a non-repeating identifier to encrypt data according to embodiments of the present invention.

Figure 2:
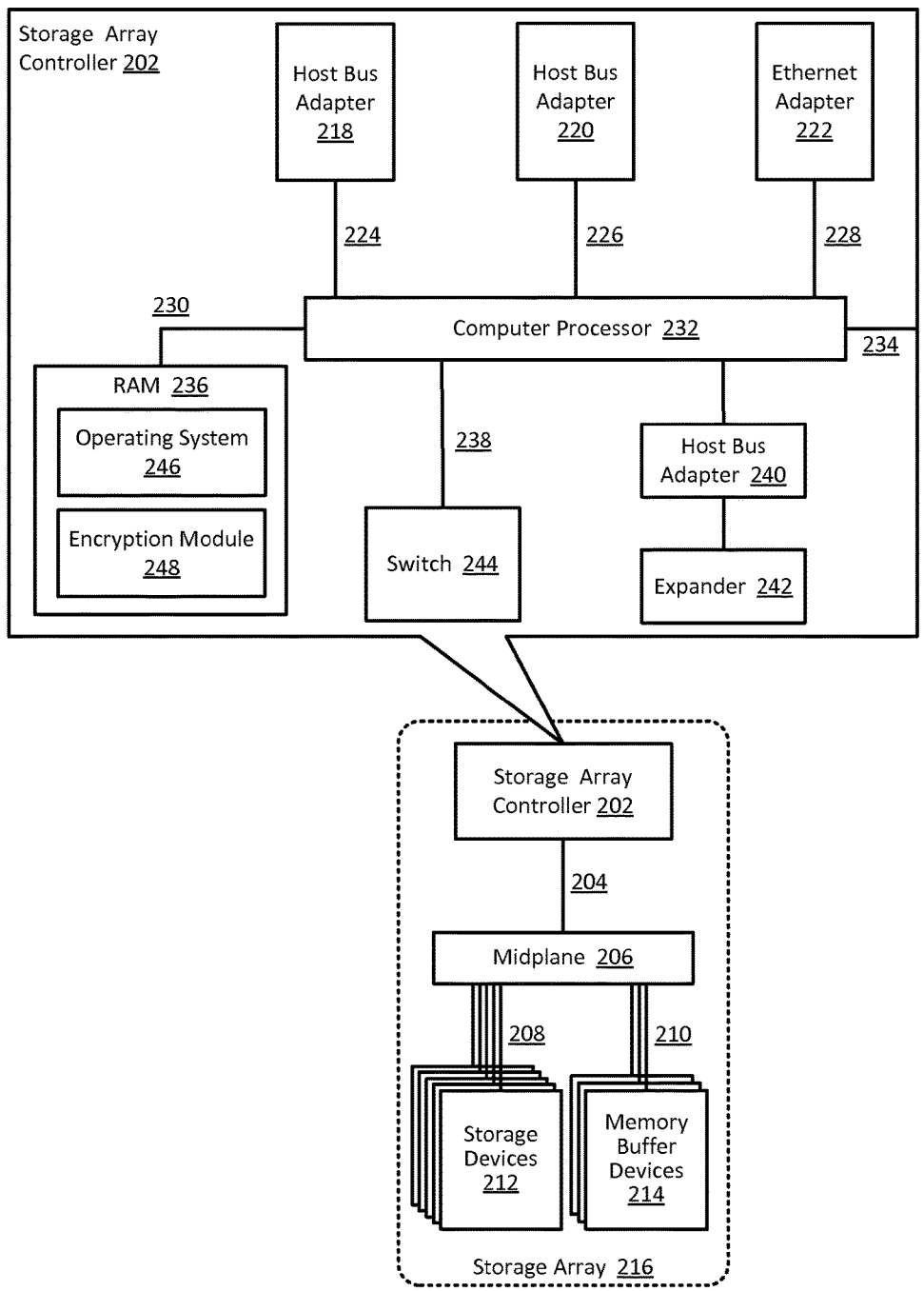
FIG. 2 sets forth a block diagram of an example storage array controller useful in utilizing a non-repeating identifier to encrypt data according to embodiments of the present invention.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for utilizing a non-repeating identifier to encrypt data according to embodiments of the present invention include UNIX™, Linux™, Microsoft Windows™, and others as will occur to those of skill in the art. Also stored in RAM (236) is an encryption module (248), a module that includes computer program instructions for utilizing a non-repeating identifier to encrypt data according to embodiments of the present invention. The functionality of the encryption module (248) will be described in greater detail below, but readers will appreciate that while the encryption module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect.

Readers will recognize that these components, protocols, adapters, and architectures are for illustration only, not limitation. Such a storage array controller may be implemented in a variety of different ways, each of which is well within the scope of the present invention.

Figure 3:
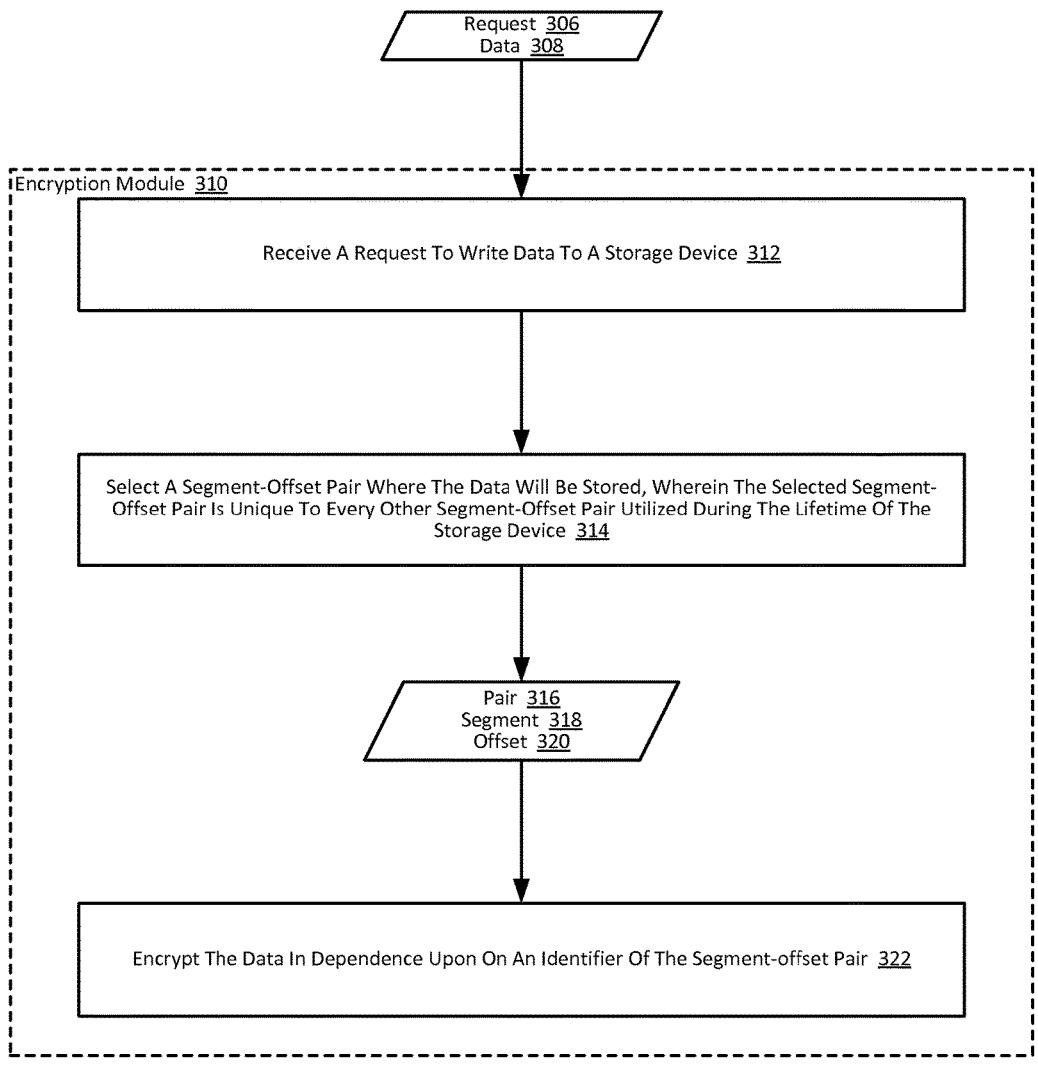
FIG. 3 sets forth a flow chart illustrating an example method for utilizing a non-repeating identifier to encrypt data according to embodiments of the present invention.
Figure 3:
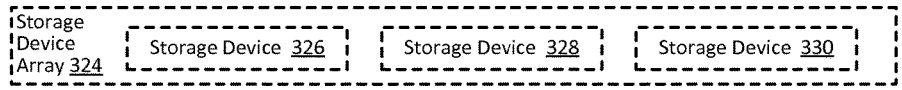

For further explanation, FIG. 3 sets forth a flow chart illustrating an example method for utilizing a non-repeating identifier to encrypt data according to embodiments of the present invention. The example method depicted in FIG. 3 may be carried out, at least in part, by an encryption module (310). The encryption module (310) of FIG. 3 may be embodied as a module of computer program instructions executing on computer hardware such as a computer processor. The encryption module (310) of FIG. 3 may be executing on a storage array controller such as the storage array controllers described above with reference to FIG. 1 and FIG. 2. The encryption module (310) of FIG. 3 may alternatively be executing on a storage device such as the storage devices described above with reference to FIG. 1 and FIG. 2. In another alternative embodiment, a first encryption module may be executing on a storage array controller while a second encryption module may be executing on a storage device, where each encryption module is configured to cooperatively perform the functions described herein.

The example method depicted in FIG. 3 includes receiving (312) a request (306) to write data (308) to a storage device (326, 328, 330). The request (306) of FIG. 3 may be embodied, for example, as one or more messages received by a storage array controller that is executing the encryption module (310). The one or more messages may include, for example, a first message to initiate the write process and one or more subsequent messages that include the data (308), all of which may be received by the storage array controller over a data communications network such as a SAN, a LAN, or any other data communications link. The request (306) of FIG. 3 may include, for example, an identification of a device that issued the request (306), an identification of a user that issued the request (306), the data (308) that is to be written to the one or more of the storage devices (326, 328, 330), a reference to the data (308) that is to be written to the one or more of the storage devices (326, 328, 330), and any other information needed to service the request (306).

The example method depicted in FIG. 3 also includes selecting (314) a segment-offset pair (316) where the data (308) will be stored. The segment-offset pair (316) of FIG. 3 includes a segment identifier (318) and an offset value (320). The segment identifier (318) and the offset value (320) represent a location in memory within the storage device (326, 328, 330) where the data (308) will be stored. The segment identifier (318) and the offset value (320) are logical constructs that map to physical locations within the storage device (326, 328, 330).

Consider an example in which a particular storage device (326) included 4 gigabytes ('GBs') of storage. In such an example, the storage could be logically broken up, for example, into four segments of 1 GB each. In such an example, the first GB of storage could be associated with a segment identifier of "1," the second GB of storage could be associated with a segment identifier of "2," the third GB of storage could be associated with a segment identifier of "3," and the fourth GB of storage could be associated with a segment identifier of "4." In such an example, the offset value represents the displacement from the beginning of the segment identified in a segment-offset pair.

In the example method depicted in FIG. 3, the selected segment-offset pair (316) is unique relative to every other segment-offset pair previously utilized by the storage device and the selected segment-offset pair (316) also cannot be reutilized to service another subsequently received request to write data to the storage device (326, 328, 330). In such a way, the selected segment-offset pair (316) is unique relative to every other segment-offset pair utilized during the lifetime of the storage device (326, 328, 330). Because the selected segment-offset pair (316) is unique relative to every other segment-offset pair utilized during the lifetime of the storage device (326, 328, 330), no other data will ever be written to the selected segment-offset pair (316) during the lifetime of the storage device (326, 328, 330).

The selected segment-offset pair (316) can be unique relative to every other segment-offset pair utilized during the lifetime of the storage device (326, 328, 330) because data may be written to the storage devices (326, 328, 330) in only one of two ways: 1) data may be written to free space in an existing segment, or 2) a new segment may be created and data may be written to the new segment. In the situation where data is written to free space in an existing segment, because the space is free, no other data has been written to that particular segment-offset location. In the situation where a new segment is created and data is written to the new segment, because segment identifiers are not reused, no other data has been written to that particular segment-offset location.

Readers will appreciate that as data in a particular segment becomes invalid (e.g., an updated version of the data has been written to another location), the invalid data may be erased and the underlying physical storage resources may be allocated to a new segment. In such an example, the valid data in the particular segment may be copied and written to another segment as described above: 1) by writing the valid data to free space in an existing segment, or 2) by creating a new segment and writing the valid data to the new segment.

Readers will further appreciate that while a particular segment-identifier pair maps to a single physical location within the storage device (326, 328, 330), multiple segment-identifier pairs may map to the same physical location within the storage device (326, 328, 330). As such, the same physical location within the storage device (326, 328, 330) may be referenced using multiple segment-identifier pairs during the lifetime of the storage device (326, 328, 330). Because each segment-offset pair (316) is unique relative to every other segment-offset pair utilized during the lifetime of the storage device (326, 328, 330), however, each segment-offset pair (316) contains unique values (e.g., a combination of a segment identifier and offset value) that will never been associated with any other data stored in the storage device (326, 328, 330) during the lifetime of the storage device (326, 328, 330).

The example method depicted in FIG. 3 also includes encrypting (322) the data (308) in dependence upon an identifier of the segment-offset pair (316). Encrypting (322) the data (308) in dependence upon an identifier of the segment-offset pair (316) may be carried out using an encryption algorithm that utilizes an initialization vector ('IV') as an input to the algorithm. In such an example, the IV may include values from the segment-offset pair (316), such as the segment identifier (318) and an offset value (320). Because the each segment-offset pair (316) is unique relative to every other segment-offset pair utilized during the lifetime of the storage device (326, 328, 330), the IV used to encrypt (322) the data (308) will also be unique relative to every other IV utilized during the lifetime of the storage device (326, 328, 330).

Figure 4:
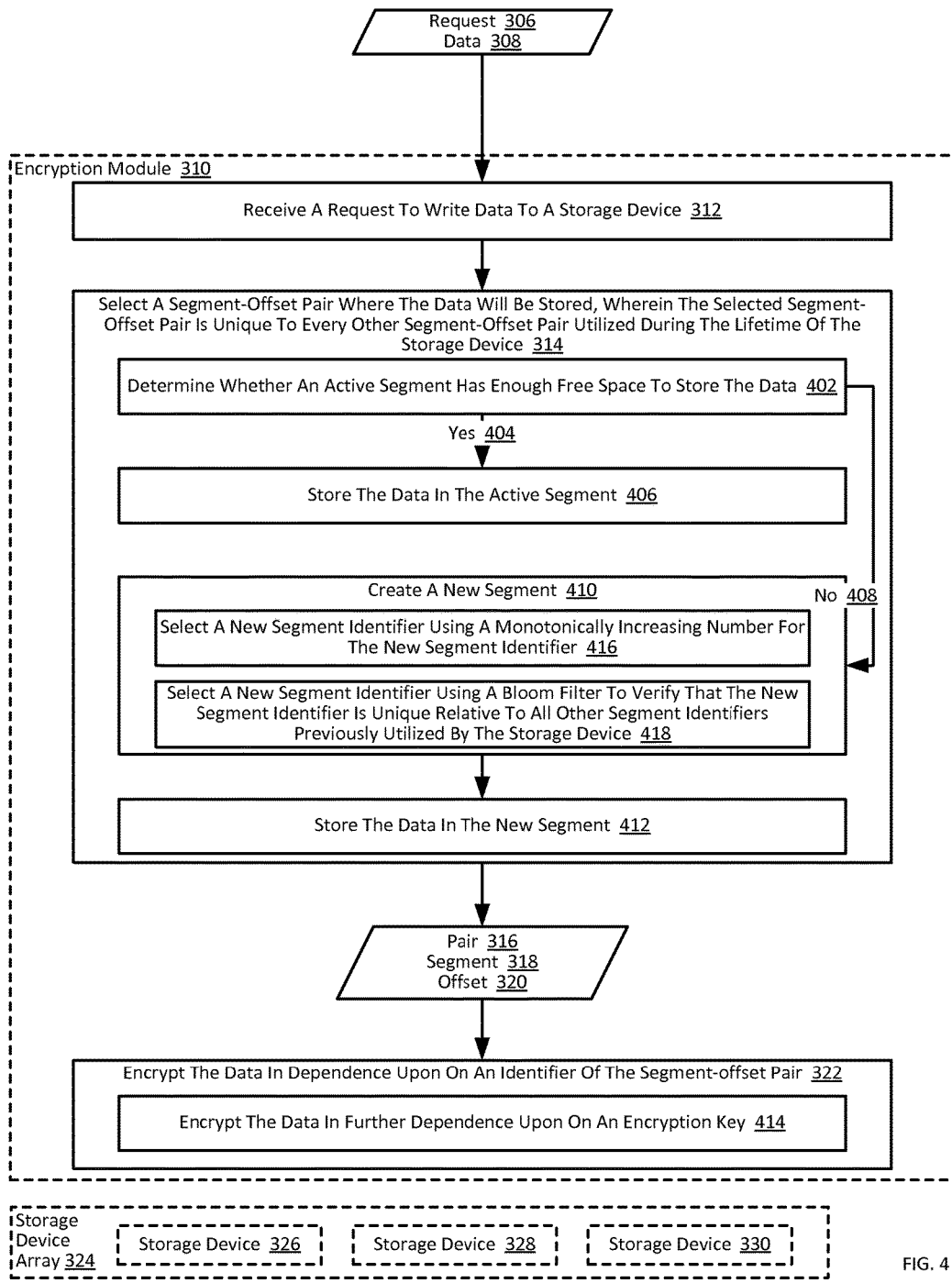
FIG. 4 sets forth a flow chart illustrating an additional example method for utilizing a non-repeating identifier to encrypt data according to embodiments of the present invention.

For further explanation, FIG. 4 sets forth a flow chart illustrating an additional example method for utilizing a non-repeating identifier to encrypt data according to embodiments of the present invention. The example method depicted in FIG. 4 is similar to the example method depicted in FIG. 3, as the example method depicted in FIG. 4 also includes receiving (312) a request (306) to write data (308) to a storage device (326, 328, 330), selecting (314) a segment-offset pair (316) where the data (308) will be stored, and encrypting (322) the data (308) in dependence upon an identifier of the segment-offset pair (316).

In the example method depicted in FIG. 4, selecting (314) a segment-offset pair (316) where the data (308) will be stored can include determining (402) whether an active segment has enough free space to store the data (308). An active segment is a segment whose allocation units have not been allocated to another segment. Determining (402) whether the active segment has enough free space to store the data (308) may be carried out, for example, by determining the size of the data (308), determining the amount of free space available in the active segment, and determining that the amount of free space available in the active segment is greater than the size of the data (308).

In the example method depicted in FIG. 4, selecting (314) a segment-offset pair (316) where the data (308) will be stored can also include, responsive to affirmatively (404) determining that the active segment does have enough free space to store the data (308), storing (406) the data (308) in the active segment. Storing (406) the data (308) in the active segment may be carried out, for example, by storing the data (308) at free locations within the active segment. Such locations may be characterized by an offset within the active segment, and as such, selecting (314) a segment-offset pair (316) where the data (308) will be stored may be carried out by determining the offset within the active segment that corresponds to the free locations within the active segment where the data (308) will be stored (406).

In the example method depicted in FIG. 4, selecting (314) a segment-offset pair (316) where the data (308) will be stored can also include, responsive to determining that the active segment does not (408) have enough free space to store the data (308), creating (410) a new segment. In the example method depicted in FIG. 4, creating (410) a new segment may include selecting a new segment identifier for the new segment. As described above, the new segment identifier must be unique relative to any other segment identifier utilized during the lifetime of the storage device (326, 328, 330). That is, the new segment identifier must not only be unique relative to any other segment identifier ever used by the storage device (326, 328, 330), but the new segment identifier must never be reused by another segment.

In the example method depicted in FIG. 4, creating (410) a new segment can include selecting (416) a new segment identifier using a monotonically increasing number for the new segment identifier. Selecting (416) the new segment identifier using a monotonically increasing number for the new segment identifier may be carried out, for example, by retrieving all other segment numbers currently utilized by the storage device (326, 328, 330) and selecting a number that is larger than all other segment numbers currently utilized by the storage device (326, 328, 330).

In the example method depicted in FIG. 4, creating (410) a new segment can alternatively include selecting (418) a new segment identifier using a Bloom filter to verify that the new segment identifier is unique relative to all other segment identifiers previously utilized by the storage device. A Bloom filter is a probabilistic data structure that is utilized to test whether an element is a member of a set. False positive matches are possible utilizing a Bloom filter but false negatives are not, meaning that an element can definitively be determined to not be a member of the set. In such an example, a set may be created that includes each segment identifier previously utilized by the storage device and the Bloom filter may be used to determine whether the new segment identifier is definitively not part of the set. As such, candidate new segment identifiers may be selected randomly but only those randomly selected new segment identifiers that are definitively determined to not be part of the set may be selected (418) as the segment identifier for the newly created segment.

Readers will appreciate that in still further embodiments, other methodologies may be utilized to ensure that the segment identifiers for newly created segments are unique relative to any other segment identifier that will be used during the lifetime of the storage device (326, 328, 330). For example, each process that may create a segment may be given non-overlapping ranges of segment identifiers that each process may use when creating a new segment. For example, a first process may be given a range of 0 to 1000 as the available segment identifiers that the first process may utilize when creating a new segment, while a second process may be given a range of 1001 to 2000 as the available segment identifiers that the second process may utilize when creating a new segment. In such an example, when a particular process runs out of available identifiers, a new non-overlapping range of segment identifiers may be provided to the process.

In the example method depicted in FIG. 4, selecting (314) a segment-offset pair (316) where the data (308) will be stored can also include, responsive to determining that the active segment does not (408) have enough free space to store the data (308), storing (412) the data (308) in the new segment. Storing (412) the data (308) in the new segment may be carried out, for example, by storing the data (308) at a storage location in the storage device (326, 328, 330) that corresponds to the new segment.

In the example method depicted in FIG. 4, encrypting (322) the data (308) in dependence upon an identifier of the segment-offset pair (316) can include encrypting (414) the data (308) in further dependence upon an encryption key. Such an encryption key may be fixed for a particular system and may be randomly generated when the system is initially set up. Encrypting (414) the data (308) in further dependence upon an encryption key may therefore be carried out utilizing an encryption algorithm that produces different encryptions based on a fixed k-bit key (k=128 or k=256, for example) and a variable m-bit IV (m=128 for example, but might be different sizes for different algorithms) generated in dependence upon an identifier of the segment-offset pair (316).

Figure 5:
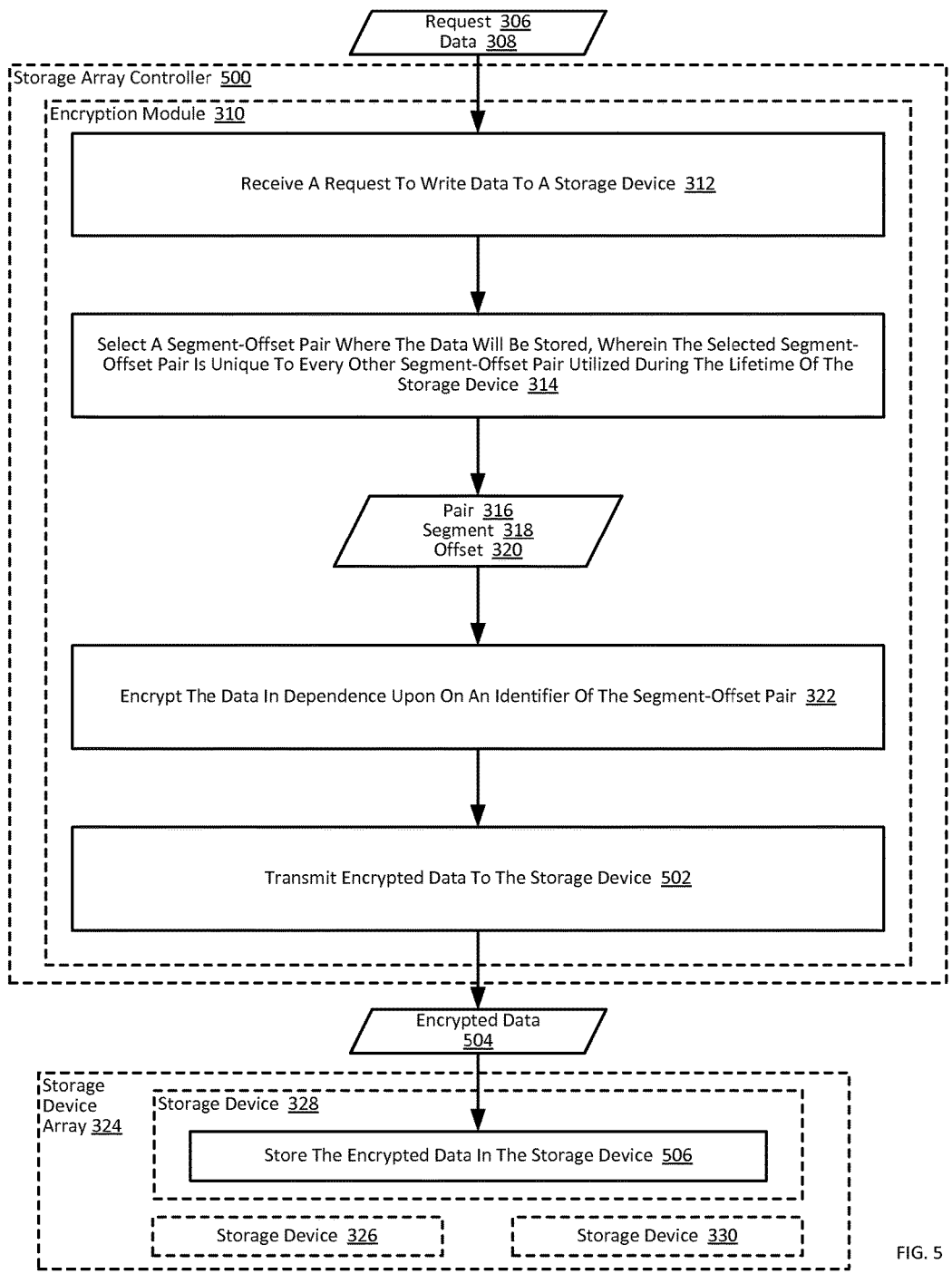
FIG. 5 sets forth a flow chart illustrating an additional example method for utilizing a non-repeating identifier to encrypt data according to embodiments of the present invention.

For further explanation, FIG. 5 sets forth a flow chart illustrating an additional example method for utilizing a non-repeating identifier to encrypt data according to embodiments of the present invention. The example method depicted in FIG. 5 is similar to the example method depicted in FIG. 3, as the example method depicted in FIG. 5 also includes receiving (312) a request (306) to write data (308) to a storage device (326, 328, 330), selecting (314) a segment-offset pair (316) where the data (308) will be stored, and encrypting (322) the data (308) in dependence upon an identifier of the segment-offset pair (316).

In the example method depicted in FIG. 5, encrypting (322) the data (308) in dependence upon an identifier of the segment-offset pair (316) is carried out by an encryption module (310) that is executing on a storage array controller (500). The storage array controller (500) of FIG. 5 may be similar to the storage array controllers described above with reference to FIG. 1 and FIG. 2.

The example method depicted in FIG. 5 also includes transmitting (502) encrypted data (504) to the storage device (328). The encrypted data (504) may be transmitted (502) from the storage array controller (500) to a particular storage device (328) via a data communications link between the storage array controller (500) and the particular storage device (328). Such a data communications link may be embodied, for example, as a plurality of PCIe links that couple the storage array controller (500) and the particular storage device (328) to different sides of a midplane, as described above with reference to FIG. 1. The encrypted data (504) may be transmitted (502) from the storage array controller (500) to a particular storage device (328) via one or more messages that may include other information useful in writing the encrypted data (504) to the particular storage device (328) such as, for example, the segment-offset pair (316).

The example method depicted in FIG. 5 also includes storing (506) the encrypted data (504) in the storage device (328). In the example method depicted in FIG. 5, the encrypted data (504) may be stored (506) at a location in the storage device (328) that corresponds to the segment-offset pair (316) selected (314) above.

Figure 6:
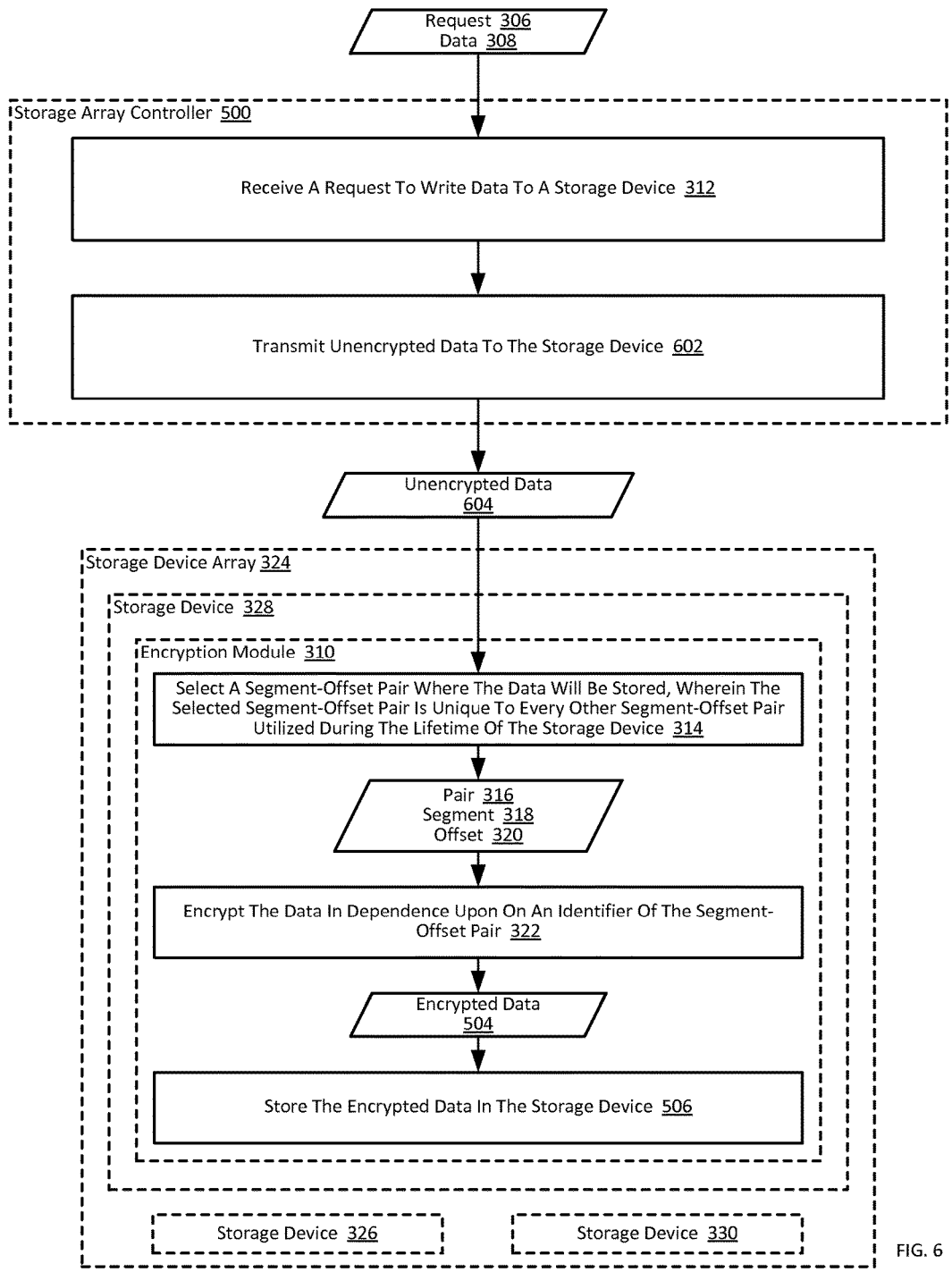
FIG. 6 sets forth a flow chart illustrating an additional example method for utilizing a non-repeating identifier to encrypt data according to embodiments of the present invention.

For further explanation, FIG. 6 sets forth a flow chart illustrating an additional example method for utilizing a non-repeating identifier to encrypt data according to embodiments of the present invention. The example method depicted in FIG. 6 is similar to the example method depicted in FIG. 3, as the example method depicted in FIG. 6 also includes receiving (312) a request (306) to write data (308) to a storage device (326, 328, 330), selecting (314) a segment-offset pair (316) where the data (308) will be stored, and encrypting (322) the data (308) in dependence upon an identifier of the segment-offset pair (316).

In the example method depicted in FIG. 6, the encryption module (310) resides on the storage devices themselves. Although FIG. 6 illustrates an encryption module (310) residing on only one storage device (328), readers will appreciate the remaining storage devices (326, 330) may also include encryption modules (310). In the example method depicted in FIG. 6, selecting (314) a segment-offset pair (316) where the data (308) will be stored and encrypting (322) the data (308) in dependence upon an identifier of the segment-offset pair (316) is carried out by an encryption module (310) that is executing on the storage device (328).

The example method depicted in FIG. 6 also includes transmitting (602) unencrypted data (604) to the storage device (328). The unencrypted data (604) may be transmitted (602) from the storage array controller (500) to a particular storage device (328) via a data communications link between the storage array controller (500) and the particular storage device (328). Such a data communications link may be embodied, for example, as a plurality of PCIe links that couple the storage array controller (500) and the particular storage device (328) to different sides of a midplane, as described above with reference to FIG. 1. The unencrypted data (604) may be transmitted (602) from the storage array controller (500) to a particular storage device (328) via one or more messages that may include other information useful in writing the unencrypted data (604) to the particular storage device (328).

In the example method depicted in FIG. 6, upon receiving the unencrypted data (604), the storage device (328) may be configured to encrypt the unencrypted data (604) and store (506) the encrypted data (504). In such an example, any additional information utilized to encrypt the unencrypted data (604) may be sent to the storage device (328) from a storage array controller or from any other source. For example, the identifier of the segment-offset pair (316), an encryption key, or any other information utilized to encrypt the unencrypted data (604) may be sent to the storage device (328) from a storage array controller or from any other source.

Example embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of utilizing a non-repeating identifier to encrypt data, the method comprising:
   receiving, by a storage controller of a storage array, a request to write data to a storage device of the storage array;
   selecting, by the storage controller, a segment-offset pair where the data will be stored, wherein the selected segment-offset pair is unique relative to every other segment-offset pair previously utilized by the storage device, wherein the selected segment-offset pair cannot be reutilized to service another request to write data to the storage device, wherein selecting the segment-offset pair includes:
      determining whether an active segment has free space to store the data; and
      responsive to determining that the active segment does not have the free space to store the data, creating a new segment using a monotonically increasing number for the new segment identifier;
   utilizing, by the storage controller, the new segment identifier of the segment-offset pair to encrypt the data; and
   writing, by the storage controller, the encrypted data to the storage device at the selected segment-offset pair.

2. The method of claim 1 wherein utilizing the new segment identifier of the segment-offset pair to encrypt the data in the storage device further comprises utilizing an encryption key.

3. The method of claim 1 wherein selecting the segment-offset pair where the data will be stored further comprises:
   responsive to determining that the active segment does have the free space to store the data, storing the data in the active segment.

4. The method of claim 1 wherein creating the new segment further comprises selecting the new segment identifier using a Bloom filter to verify that the new segment identifier is unique relative to all other segment identifiers previously utilized by the storage device.

5. An apparatus for utilizing a non-repeating identifier to encrypt data, the apparatus comprising a computer processor, a computer memory operatively coupled to the computer processor, the computer memory having disposed within it computer program instructions that, when executed by the computer processor, cause the apparatus to carry out the steps of:
   receiving, by a storage controller of a storage array, a request to write data to a storage device of the storage array;
   selecting, by the storage controller, a segment-offset pair where the data will be stored, wherein the selected segment-offset pair is unique relative to every other segment-offset pair previously utilized by the storage device, wherein the selected segment-offset pair cannot be reutilized to service another request to write data to the storage device, wherein selecting the segment-offset pair includes:
      determining whether an active segment has free space to store the data; and
      responsive to determining that the active segment does not have the free space to store the data, creating a new segment using a monotonically increasing number for the new segment identifier;
   utilizing, by the storage controller, the new segment identifier of the segment-offset pair to encrypt the data; and
   writing, by the storage controller, the encrypted data to the storage device at the selected segment-offset pair.

6. The apparatus of claim 5 utilizing the new segment identifier of the segment-offset pair to encrypt the data in the storage device further comprises utilizing an encryption key.

7. The apparatus of claim 5 wherein selecting the segment-offset pair where the data will be stored further comprises:
   responsive to determining that the active segment does have the free space to store the data, storing the data in the active segment.

8. The apparatus of claim 5 wherein creating the new segment further comprises selecting the new segment identifier using a Bloom filter to verify that the new segment identifier is unique relative to all other segment identifiers previously utilized by the storage device.

9. A computer program product for utilizing a non-repeating identifier to encrypt data, the computer program product disposed upon a non-transitory computer readable medium, the computer program product comprising computer program instructions that, when executed, cause a computer to carry out the steps of:
   receiving, by a storage controller of a storage array, a request to write data to a storage device of the storage array;
   selecting, by the storage controller, a segment-offset pair where the data will be stored, wherein the selected segment-offset pair is unique relative to every other segment-offset pair previously utilized by the storage device, wherein the selected segment-offset pair cannot be reutilized to service another request to write data to the storage device, wherein selecting the segment-offset pair includes:
      determining whether an active segment has free space to store the data; and
      responsive to determining that the active segment does not have the free space to store the data, creating a new segment using a monotonically increasing number for the new segment identifier;
   utilizing, by the storage controller, the new segment identifier of the segment-offset pair to encrypt the data; and
   writing, by the storage controller, the encrypted data to the storage device at the selected segment-offset pair.

10. The computer program product of claim 9 wherein utilizing the new segment identifier of the segment-offset pair to encrypt the data in the storage device further comprises utilizing an encryption key.

11. The computer program product of claim 9 wherein selecting the segment-offset pair where the data will be stored further comprises:
   responsive to determining that the active segment does have the free space to store the data, storing the data in the active segment.

12. The computer program product of claim 9 wherein creating the new segment further comprises selecting the new segment identifier using a Bloom filter to verify that the new segment identifier is unique relative to all other segment identifiers previously utilized by the storage device.

* * * * *